(12) United States Patent
Crabtree et al.

(10) Patent No.: US 11,687,527 B2
(45) Date of Patent: Jun. 27, 2023

(54) SYSTEM AND METHOD FOR ANALYSIS OF GRAPH DATABASES USING INTELLIGENT REASONING SYSTEMS

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 296 days.

(21) Appl. No.: 17/084,263

(22) Filed: Oct. 29, 2020

(65) Prior Publication Data

US 2021/0173831 A1    Jun. 10, 2021

Related U.S. Application Data

(63) Continuation-in-part of application No. 16/864,133, filed on Apr. 30, 2020, now Pat. No. 11,494,665, (Continued)

(51) Int. Cl.
| | | |
|---|---|---|
| *G06F 16/245* | (2019.01) | |
| *G06F 16/248* | (2019.01) | |
| *G06F 40/30* | (2020.01) | |
| *G06N 5/04* | (2023.01) | |
| *G06F 16/901* | (2019.01) | |

(52) U.S. Cl.
CPC .......... *G06F 16/245* (2019.01); *G06F 16/248* (2019.01); *G06F 16/9024* (2019.01); *G06F 40/30* (2020.01); *G06N 5/04* (2013.01)

(58) Field of Classification Search
None
See application file for complete search history.

(56) References Cited

U.S. PATENT DOCUMENTS 6,256,544 B1    7/2001  Weissinger
9,189,509 B1 *  11/2015 Tsypliaev ............ G06F 16/9024
(Continued)

FOREIGN PATENT DOCUMENTS

CN          102253933 A      11/2011
WO          2011011942 A1    2/2011
(Continued)

*Primary Examiner* — Alford W Kindred
*Assistant Examiner* — Cao D Vuong
(74) *Attorney, Agent, or Firm* — Galvin Patent Law LLC; Brian R. Galvin; Brian S. Boon

(57) ABSTRACT

A system for analyzing graph databases using intelligent reasoning systems including scalable collection of, and transformation of, graph data into facts suitable for use with programming logic languages doing deductive reasoning. A graph analyzer ingests disparate graph data from across the Internet and transforms the graph data into a fact table. In order to reduce latency and processing congestion, a stream processing engine and sharding strategy are employed to ensure scalability through parallelized processing of programming logic queries. Transformed graph data, now relational data, is utilized with programming logic languages that allow for hypothetical queries whereby an inference engine can deduce new information to satisfy such a query. Furthermore, the self-contained nature of inputs, outputs, and transformations of the system means strict data provenance can be observed and adhered to.

14 Claims, 8 Drawing Sheets

Related U.S. Application Data which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/616,427, filed on Jun. 7, 2017, now abandoned, which is a continuation-in-part of application No. 14/925,974, filed on Oct. 28, 2015, now abandoned, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962.

(60) Provisional application No. 62/568,298, filed on Oct. 4, 2017, provisional application No. 62/568,291, filed on Oct. 4, 2017.

(56) References Cited

U.S. PATENT DOCUMENTS

| | | | | |
|---|---|---|---|---|
| 9,697,475 | B1 * | 7/2017 | Subramanya | G06N 20/00 |
| 9,785,696 | B1 * | 10/2017 | Yakhnenko | G06F 16/30 |
| 9,798,829 | B1 * | 10/2017 | Baisley | G06F 16/9024 |
| 10,430,712 | B1 * | 10/2019 | Reed | G06N 5/046 |
| 10,810,193 | B1 * | 10/2020 | Subramanya | G06F 16/243 |
| 2007/0012161 | A1 | 1/2007 | Lyles | |
| 2008/0172353 | A1 | 7/2008 | Lim et al. | |
| 2010/0228693 | A1 | 9/2010 | Dawson et al. | |
| 2012/0239605 | A1 * | 9/2012 | Hohimer | G06N 5/02 706/55 |
| 2013/0041921 | A1 | 2/2013 | Cooper et al. | |
| 2014/0040975 | A1 | 2/2014 | Raleigh et al. | |
| 2014/0074826 | A1 | 3/2014 | Cooper et al. | |
| 2015/0310129 | A1 * | 10/2015 | Ushijima | G06F 16/25 707/798 |
| 2016/0275123 | A1 | 9/2016 | Lin et al. | |

FOREIGN PATENT DOCUMENTS

| | | |
|---|---|---|
| WO | 2014159150 A1 | 10/2014 |
| WO | 2017075543 A1 | 5/2017 |

* cited by examiner

SYSTEM AND METHOD FOR ANALYSIS OF GRAPH DATABASES USING INTELLIGENT REASONING SYSTEMS

CROSS-REFERENCE TO RELATED APPLICATIONS

| application No. | Date Filed | Title |
|---|---|---|
| Current application | Herewith | SYSTEM AND METHOD FOR ANALYSIS OF GRAPH DATABASES USING INTELLIGENT REASONING SYSTEMS |
| | | Is a continuation-in-part of: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS |
| | | which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct. 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 U.S. Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 U.S. Pat. No. 10,210,255 | Dec. 31, 2015 Issue Date Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | SYSTEM AND METHOD FOR ANALYSIS OF GRAPH DATABASES USING INTELLIGENT REASONING SYSTEMS |
| | | Is a continuation-in-part of: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS |
| | | which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |

-continued

| application No. | Date Filed | Title |
|---|---|---|
| Current application | Herewith | SYSTEM AND METHOD FOR ANALYSIS OF GRAPH DATABASES USING INTELLIGENT REASONING SYSTEMS Is a continuation-in-part of: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING which is a continuation-in-part of: |
| 15/489,716 | Apr. 17, 2017 | REGULATION BASED SWITCHING SYSTEM FOR ELECTRONIC MESSAGE ROUTING which is a continuation-in-part of: |
| 15/409,510 | Jan. 18, 2017 | MULTI-CORPORATION VENTURE PLAN VALIDATION EMPLOYING AN ADVANCED DECISION PLATFORM which is a continuation-in-part of: |
| 15/379,899 | Dec. 15, 2016 | INCLUSION OF TIME SERIES GEOSPATIAL MARKERS IN ANALYSES EMPLOYING AN ADVANCED CYBER-DECISION PLATFORM which is a continuation-in-part of: |
| 15/376,657 U.S. Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION | the entire specification of each of which is incorporated herein by reference.

BACKGROUND

Field of the Art

The disclosure relates to the field of data analytics, and more particularly to the field of data engineering.

Discussion of the State of the Art

Over the past forty years the relational database (i.e., fact table) model has been widely used for data storage applications. In more recent years, as data sets grow ever larger, there has been a shift to use the increasingly popular graph database model. Unlike relational databases, which store data in tables, graph databases use nodes and relationships between nodes to store data and are significantly more efficient for handling large data sets for certain query patterns as relationships between entities are explicitly encoded as opposed to inferred from joins as in many other popular data models. This poses challenges with respect to the push for a semantic web, where the need for deducing relationships between geographically disperse data is increasingly paramount.

Over the years, fact tables have found uses as deductive databases for programming logic languages which are capable of deducing new knowledge by employing rules based on the facts present in relational tables. And while graph databases are especially powerful over relational/table databases for existing relationships and information, they currently lack comprehensive support for programming logic languages that would allow deduction of new information. This is a significant problem in fields such as semantic analysis as two competing and incompatible data storage models impede the work of data scientists and data users alike. If programming logic languages are to exploit the considerable amount of graph data for deductive reasoning, there must exist a system and method for transforming and using graph data into a standard schema.

What is needed is a system and method for analyzing graph databases using intelligent reasoning systems including scalable collection of, and transformation of, graph data into facts suitable for use with programming logic languages for deductive reasoning.

SUMMARY

Accordingly, the inventor has conceived and reduced to practice, a system and method for analyzing graph databases using intelligent reasoning systems including scalable collection of, and transformation of, graph data into facts suitable for use with programming logic languages doing deductive reasoning. A graph analyzer ingests disparate graph data from across the Internet and transforms the graph data into a fact table. In order to reduce latency and processing congestion, a stream processing engine and sharding strategy are employed to ensure scalability through parallelized processing of programming logic queries. Transformed graph data, now relational data, is utilized with programming logic languages that allow for hypothetical queries whereby an inference engine can deduce new information to satisfy such a query. Furthermore, the self-contained nature of inputs, outputs, and transformations of the system means strict data provenance can be observed and adhered to.

According to a preferred embodiment, a system analyzing graph databases using intelligent reasoning systems including scalable collection of, and transformation of, graph data into facts suitable for use with programming logic languages for deductive reasoning is disclosed, comprising: a computing device comprising a memory, a processor, and a non-volatile data storage device; a stream processing engine comprising a first plurality of programming instructions stored in the memory of, and operating on the processor of, the computing device, wherein the first plurality of programming instructions, when operating on the processor, cause the computing device to: receive an ontology-mediated query, wherein the ontology-mediated query is constructed by a programming logic language; ingest one or more graph-based databases related to the ontology-mediated query; identify a storage technology and data model of each graph-based database; and send the identified storage technology and data model of each graph-based database to a translation service; a translation service comprising a second plurality of programming instructions stored in the memory of, and operating on the processor of, the computing device, wherein the second plurality of programming instructions, when operating on the processor, cause the computing device to: convert each graph-based database to facts suitable for use with programming logic languages for deductive reasoning, wherein the conversion is based on the identified storage technology and data model; and send the facts suitable for use with programming logic languages for deductive reasoning to a sharding service; and a sharding service comprising a second plurality of programming instructions stored in the memory of, and operating on the processor of, the computing device, wherein the second plurality of programming instructions, when operating on the processor, cause the computing device to: combine the facts suitable for use with programming logic languages for deductive reasoning from the graph-based databases into a fact table; and a semantic reasoner comprising a third plurality of programming instructions stored in the memory of, and operating on the processor of, the computing device, wherein the third plurality of programming instructions, when operating on the processor, cause the computing device to: satisfy the ontology-mediated query by analyzing the fact table; and output the ontology-mediated query results.

According to a preferred embodiment, a method analyzing graph databases using intelligent reasoning systems including scalable collection of, and transformation of, graph data into facts suitable for use with programming logic languages for deductive reasoning is disclosed, comprising the steps of: receiving an ontology-mediated query, wherein the ontology-mediated query is constructed by a programming logic language; ingesting one or more graph-based databases related to the ontology-mediated query; identifying a storage technology and data model of each graph-based database; converting each graph-based database to facts suitable for use with programming logic languages for deductive reasoning, wherein the conversion is based on the identified storage technology and data model; combining the facts suitable for use with programming logic languages for deductive reasoning from the graph-based databases into a fact table; and providing the fact table to the programming logic language to satisfy the ontology-mediated query; satisfying the ontology-mediated query by analyzing the fact table; and outputting the ontology-mediated query results.

According to one aspect, the system further comprises an event log, wherein the event log provides a means for data provenance.

According to one aspect, the stream processing engine uses distributed computing to process the ontology-mediated query.

According to one aspect, the system further comprises a semantic reasoner.

According to one aspect, the semantic reasoner deduces new information from the fact table.

According to one aspect, the new information is integrated into the fact table.

According to one aspect, the semantic reasoner uses the fact table to satisfy a hypothetical query.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
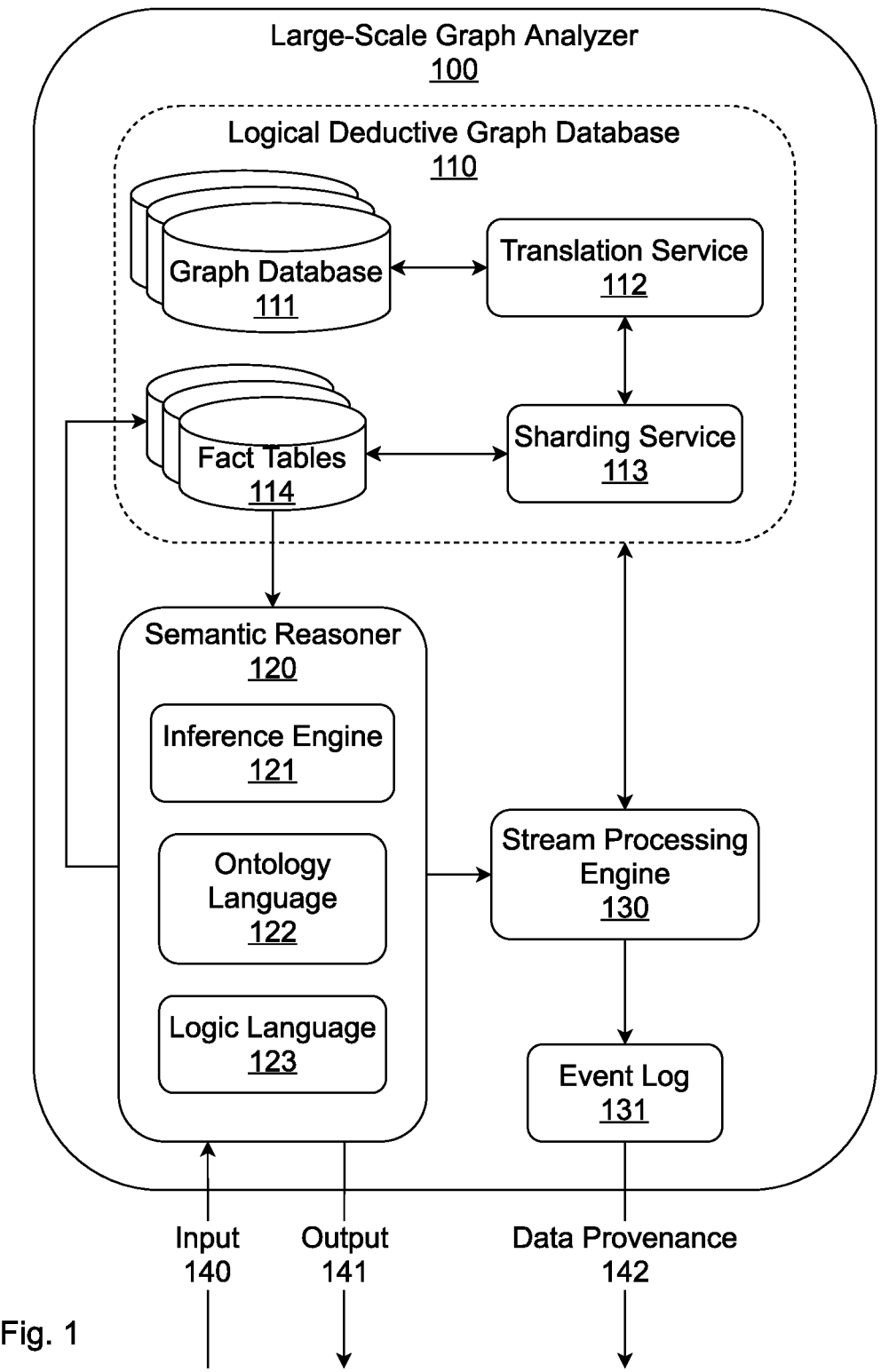
FIG. 1 is a block diagram illustrating an exemplary system architecture for a large-scale graph analyzer.

The inventor has conceived and reduced to practice a system and method for analyzing graph databases using intelligent reasoning systems including scalable collection of, and transformation of, graph data into facts for use with programming logic languages for deductive reasoning. A graph analyzer ingests disparate graph data from across the Internet and transforms the graph data into a fact table, i.e., facts suitable for use with programming logic languages for deductive reasoning. In order to reduce latency and processing congestion, a stream processing engine and sharding strategy are employed to ensure scalability through parallelized processing of programming logic queries. Transformed graph data, now relational data, is utilized with programming logic languages that allow for hypothetical queries whereby an inference engine can deduce new information to satisfy such a query. Furthermore, the self-contained nature of inputs, outputs, and transformations of the system means strict data provenance can be observed and adhered to.

Currently, there exist various formats of, and standards for, graph data. There exist limited solutions for one-off transformations of graph data to relational data (facts suitable for use with programming logic languages for deductive reasoning) but on small and targeted data sets with little to no practical value. This disclosure describes a centralized system that comprises a comprehensive transformation solution whereby all graph data can be utilized by programming logic languages for deductive queries.

An ontology-mediated query, typically specified by Web Ontology Language (OWL) or Resource Description Framework (RDF), is posed to a programming logic language such as Datalog, Prolog, or other logic programming language. The query is handled by the stream processing engine (e.g., Flink as one example) which can process the query as an event-driven and scalable bounded or unbounded stream. The stream processing engine handles the jobs and tasks required to retrieve the relevant information from various graph data sources working in conjunction with a graph-processing API (e.g. Gelly).

As relevant nodes and relationships are ingested from around the Internet, the translation service identifies the storage structure and data model which it uses to apply the correct transformation to each node and relation into a separate fact, which is then stored in as facts suitable for use with programming logic languages for deductive reasoning (i.e., a relational table). A sharding service handles the data persistence with respect to the fact tables where significantly large tables are horizontally partitioned across a cluster of database nodes. Once the fact tables have been populated, the semantic reasoner uses the logic language and the ontology language to specify a set of inference rules where the query is then processed and satisfied. If the query requires data, an inference engine can produce such data using deductive logic. Finally, since the inputs, outputs, and transformations are captured wholly within the system, a means of data provenance is provided which also lends itself to schema enforcement.

An ontology-mediated query, typically specified by web ontology language (OWL) or resource description framework (RDF), is posed to a programming logic language such as Datalog, Prolog, or other logic programming language. The query is handled by the stream processing engine (e.g., Mink) which can process the query as an event-driven and scalable bounded or unbounded stream. The stream processing engine handles the jobs and tasks required to retrieve the relevant information from various graph data sources working in conjunction with a graph-processing API (e.g. Gelly). As relevant nodes and relationships are ingested from around the Internet, the translation service converts each node and relation into a separate fact, which is then stored in as facts suitable for use with programming logic languages for deductive reasoning (i.e., a relational table). A sharding service handles the data persistence layer with respect to the fact tables where significantly large tables are horizontally partitioned across a cluster of database nodes. Once the fact tables have been populated, the semantic reasoner uses the logic language and the ontology language to specify a set of inference rules where the query is then processed and satisfied. Since the inputs, outputs, and transformations are captured within the system, this also provides a means of data provenance which further enforces schema trustworthiness and enforcement.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for a large-scale graph analyzer. According to one embodiment, a large-scale graph analyzer 100 comprises a logical deductive graph database 110, a semantic reasoner 120, a stream processing engine 130, and an event log 131. The large-scale graph analyzer 100 receives and input query 140, retrieves and transforms the relevant data, deduces any pertinent new data, and produces an output result 141. A secondary output 142 in the form of an event stream provides users with a data provenance log.

According to one aspect, a semantic reasoner 120, software that infers a logical consequence from a set of facts, as in the case of fact tables in a deductive database, comprises an interference engine 121, an ontology language 122, and a logic programming language 123. The inference engine 121 may work in one of two modes: forward chaining and backwards chaining. Other embodiments may comprise probabilistic reasoners, non-axiomatic reasoners, or a probabilistic logic network. Embodiments may also employ any number of ontology languages 122, traditional syntax languages (e.g., Common Logic, Frame-logic, Knowledge Interchange Format, etc.), markup ontology languages (e.g., Ontology Inference Layer, Web Ontology Language, Resource Description Framework, etc.), and controlled or open vocabulary natural languages (e.g., Attempto Controlled English, Executable English, etc.). Embodiments may also comprise any logic programming language 123 where the language rules are written in the forms of clauses and are read declaratively as logical implications (e.g., Prolog, Answer Set Programming, and Datalog).

The semantic reasoner 120 may further be used for schema generation where the deductive capabilities of the semantic reasoner 120 via the inference engine 121 coupled with the logic and ontology languages 122/123 provide the means to deduce new information. This is accomplished by using forwards and backwards chaining techniques of the inference engine which is bounded, informed, and enforced by the ontological and logic languages. Integrating deduced information into the existing fact table (fact tables suitable for use with programming logic languages for deductive reasoning) ontology in addition to answering queries allows for the reliable schema generation of sparse data sets.

According to one aspect, the logical deductive graph database 110 comprises a graph database 111, a translation service 112, a sharding service 113, and at least one fact table 114. Graph databases 111 may comprise both public and private databases, co-located or geographically dispersed, and comprised of any storage technology and data model. The translation service 112 comprises a series of transformation modules that convert any storage technology and data model to a fact table model. In general, each transformation module converts the graph nodes and relationships to a fact, rule, or constraint or any combination thereof. The sharding service 113 breaks up large tables into smaller chunks called shards that are spread across multiple servers. This allows significantly large fact tables to be generated from the ingestion of large amounts of graph data. Other embodiments may use other distributed persistence techniques such as replication, federation, or rely on cloud-based persistence vendors. Fact tables 114 may be equally persisted by replicating, partitioning, and federation strategies while optionally being co-located or cloud-based.

The stream processing engine 130 typically comprises processes that manage queries or programs through distributed execution of event-driven application whereby stateful computations may be achieved over streaming pipelines. According to one embodiment, Apache Flink® with a graph processing API such as Gelly may be used to coordinate the ingestion of graph data 111 to the translation service (ran as an Flink program code) and output to the sharding service 113. Furthermore, the sharding service 113 by be directed by the stream processing engine 130 classifier stages (Flink job) to ascertain the most appropriate node. Chains of classifiers may be arranged hierarchically to optimize data ingestion pertaining to precise portions of the graph data. Other stream processing engines 113 may be used such as Spark, Kafka, and Beam. The integration of specific software platforms is not limiting to this embodiment. A person of ordinary skill in the art will be aware of other possible combinations of stream processing engines 113, reasoners (otherwise known as inference engines and rule engines) 120/121, ontology languages 122, and logic languages 123 available for implementation.

One example of the large-scale graph analyzer 110 follows: consider one DNA sequencing company acquires a competing DNA sequencing company. The complex task of combining both company's databases now arises. Consider further, the task is not to simply combine the data and remove duplicates, but the company must now also use both sets of information to deduce new relations between the persons sequenced. This must happen through logical deduction and must also be auditable.

The company must now use the large-scale graph analyzer 100 to ingest both databases, translate both into table format, use the logic language to combine data, use the inference engine 121 to deduce new relations, and convert back into graph data. The process of converting fact table back to graph data is simply the inverse operation where the event log 131 may inform the system as to how the data was initially converted. Other embodiments may use other modules or functions known in the art to perform conversions and translations.

In the event data becomes corrupted, a syncing error occurred, or improper relations are reported by customers, the company may simply change their programming logic and try again as the original data was ingested into the fact tables 114 and not overwritten. In some cases, or embodiments where auditability is important or core data was lost or damaged, data provenance 142 techniques may be used to infer, correct, and restore such problems.

Figure 2:
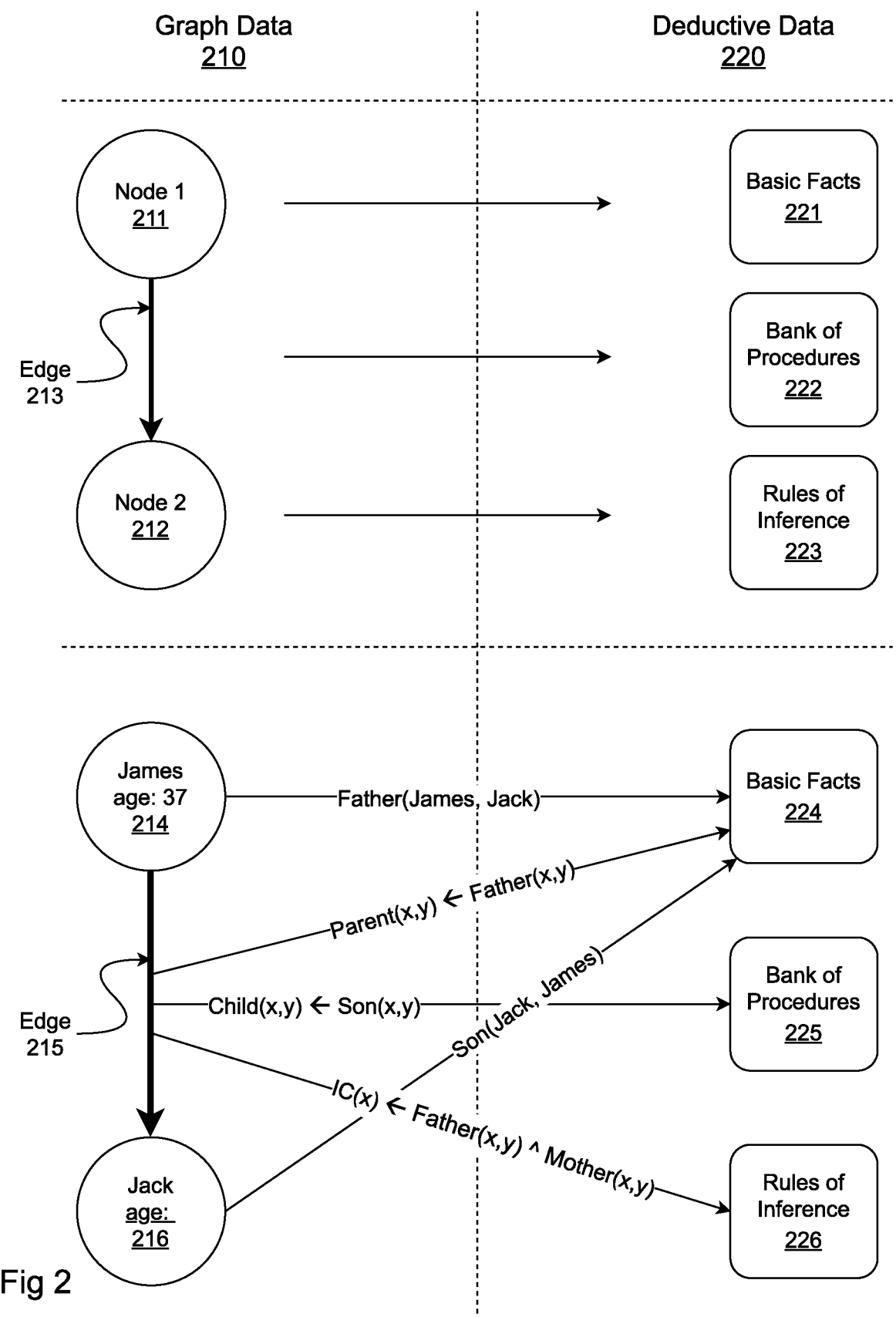
FIG. 2 is a block diagram of an exemplary method for translating native property graph data into translational data.

FIG. 2 is a block diagram explaining an exemplary method for translating graph data into data suitable for deductive reasoning. The left side of the diagram represents data 210 found in a graph database. The right side represents data stored in tables 220 as found in a deductive database. According to this method, nodes 211/212 and relationships 213 between nodes 211/212 are copied, moved, or otherwise translated to a deductive database 220 as a set of basic facts 221, a bank of procedures 222, and a set of rules for inference 223. Below are example programming logic statements that nodes and edges must be translated into:

Basic Fact: F(x, y)
Bank of Procedures: F1(x,y)←F2(x,y)
 F1(x,y)←F3(x,y)
Rules for Inference: I(x)←F2(x,y)^F3(x,y)

As one example, a genealogy tree of a father named James 214 and a son named Jack 216 exists in a knowledge graph with standard native property graph format. Persons, namely James and Jack, are stored as nodes 214/216 along with any associated data such as age. The relationship between the father and son is stored as an edge 215. Using a native property graph query language like Cypher, one may extract the nodes 214/216 and relationships 215, and then use the returned data to specify a fact table entry for each result. More specifically, the large-scale graph analyzer while mapping relationships between parents and a child, deduces that a father of a child is also a parent. Furthermore, should the knowledge graph include Jack's mother, the large-scale graph analyzer may then deduce that a parent can be either a mother or a father but not both. Procedures and inferences may be manually programmed, or various automated methods may be used.

Basic Facts: Person(James, 37)
 Person(Jack, "null")
 Father(James, Jack)
 Son(Jack, James)
Bank of Procedures: Parent(x,y)←Father(x,y)
 Child(x,y)←Son(x,y)
 Parent(x,y)←Mother(x,y)
Rules of Inference: IC(x)←Father(x,y)^Mother(x,y)

The method shown in this example is not limiting of the invention as this is simply an example of one type of translation for purposes of understanding and explanation. Many means may be used to implement the translation. For example, manual construct a translation module for each combination of data structure and model is possible, but a more efficient means of implementation would be to use machine learning algorithms to convert graph data within bounded operating parameters. Persons of ordinary skill in the art may employ different methods and techniques for graph to relational conversions.

DETAILED DESCRIPTION OF EXEMPLARY ASPECTS

Figure 3:
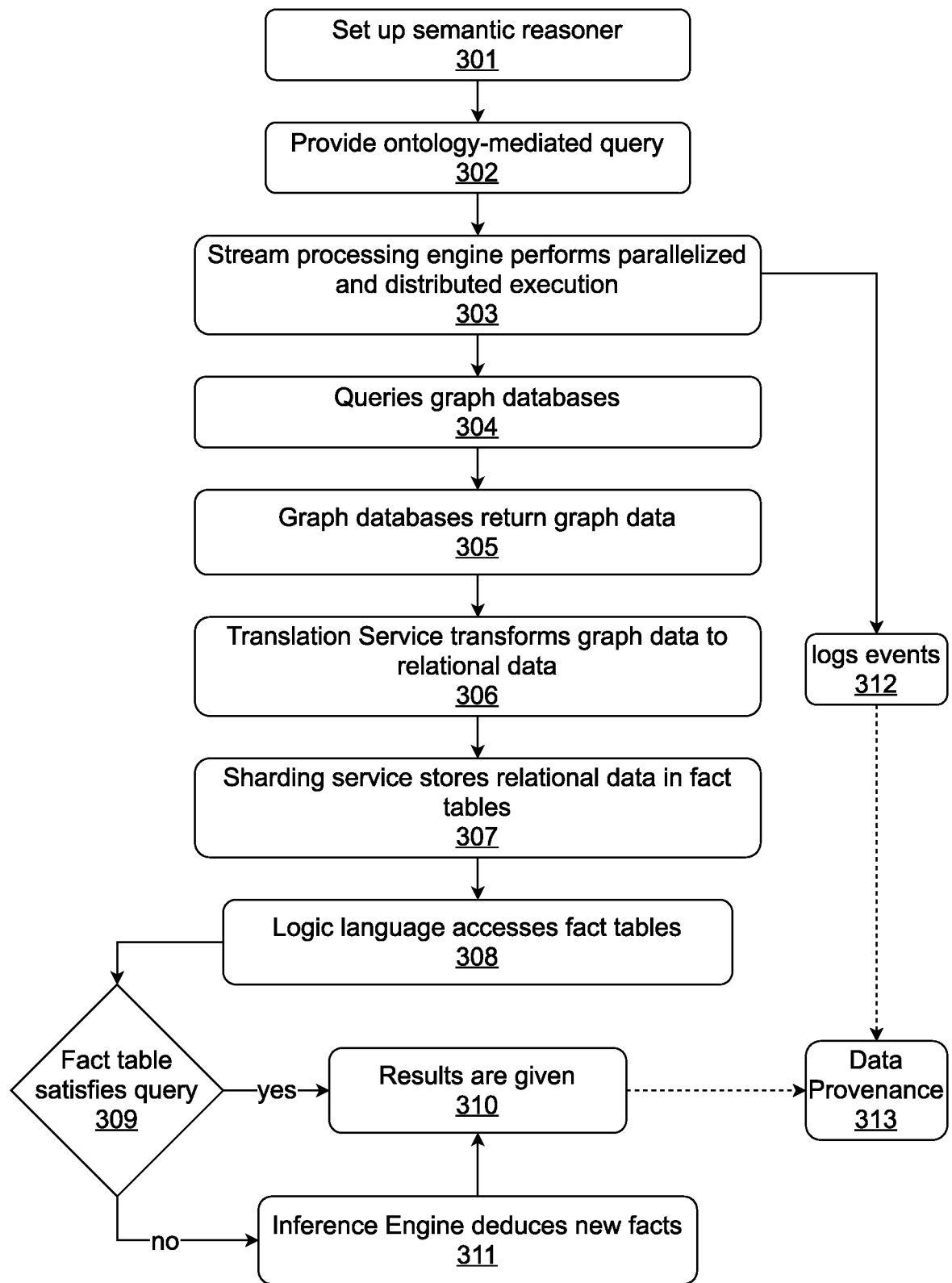
FIG. 3 is a flow diagram illustrating an exemplary method for a large-scale graph analyzer, according to one embodiment.

FIG. 3 is a flow diagram illustrating an exemplary method for a large-scale graph analyzer, according to one embodiment. The first step in deploying the large-scale graph analyzer is to in set up the semantic reasoner 301. This can be done by first choosing one or more ontology languages, where an ontology language is a formal construct to allow the encoding of knowledge about specific domains and support the processing of that knowledge through a plurality of reasoning rules. The second step to setting up the semantic reasoner 301 is to choose a logic programming language which is a programming paradigm based on formal logic.

Lastly, any number of existing inference engines may be used, or one can be programmed specific for the application desired by the user. Public and private graph data sources must be set up and the translation modules for each data storage type and model must be implemented. API's typically are used to communication between software platforms and databases, or other standardized protocols such as HTTP, FTP, etc.

Upon completion of the configuration, a user posits a query 302 through the programming logic language, which is typically mediated and bounded by the ontology language chosen. The query is received by the stream processing engine where distributed processing and storage handle the large amount of graph data needed for the query 303. Not all queries need a large amount of data, this example uses the highest degree of difficulty for exemplary purposes. The stream processing engine queries the graph databases 304 for relevant nodes and edges, whereby the graph databases return said relevant nodes and edges 305.

The translation service identifies the type of storage structure and data model in order to call the appropriate translation module that will convert the retrieved data into tabular form 306. As graph data is converted/translated, the sharding service, informed by the stream processing engine, allocates distributed shards of data 307 forming the overall fact table for the query. The stream processing engine upon detecting the graph data retrieval and conversion is complete, notifies the semantic reasoner to complete the query 308.

If the query is satisfied 309 by the existing fact table, the results are given 310. Should the query not meet the threshold for satisfaction, the inference engine performs either backwards or forward chaining to deduce the information 311 required to satisfy the query, at which point the results will then be given 310. During the steps from 303-311, the stream processing engine is logging all events 312 and providing a means by which data provenance 313 is possible. Some embodiments may use machine learning algorithms and the data provenance to self-authentic trustworthy results. Other embodiments may use data provenance for auditability function and further embodiments may use the event log for data redundancy.

Figure 4:
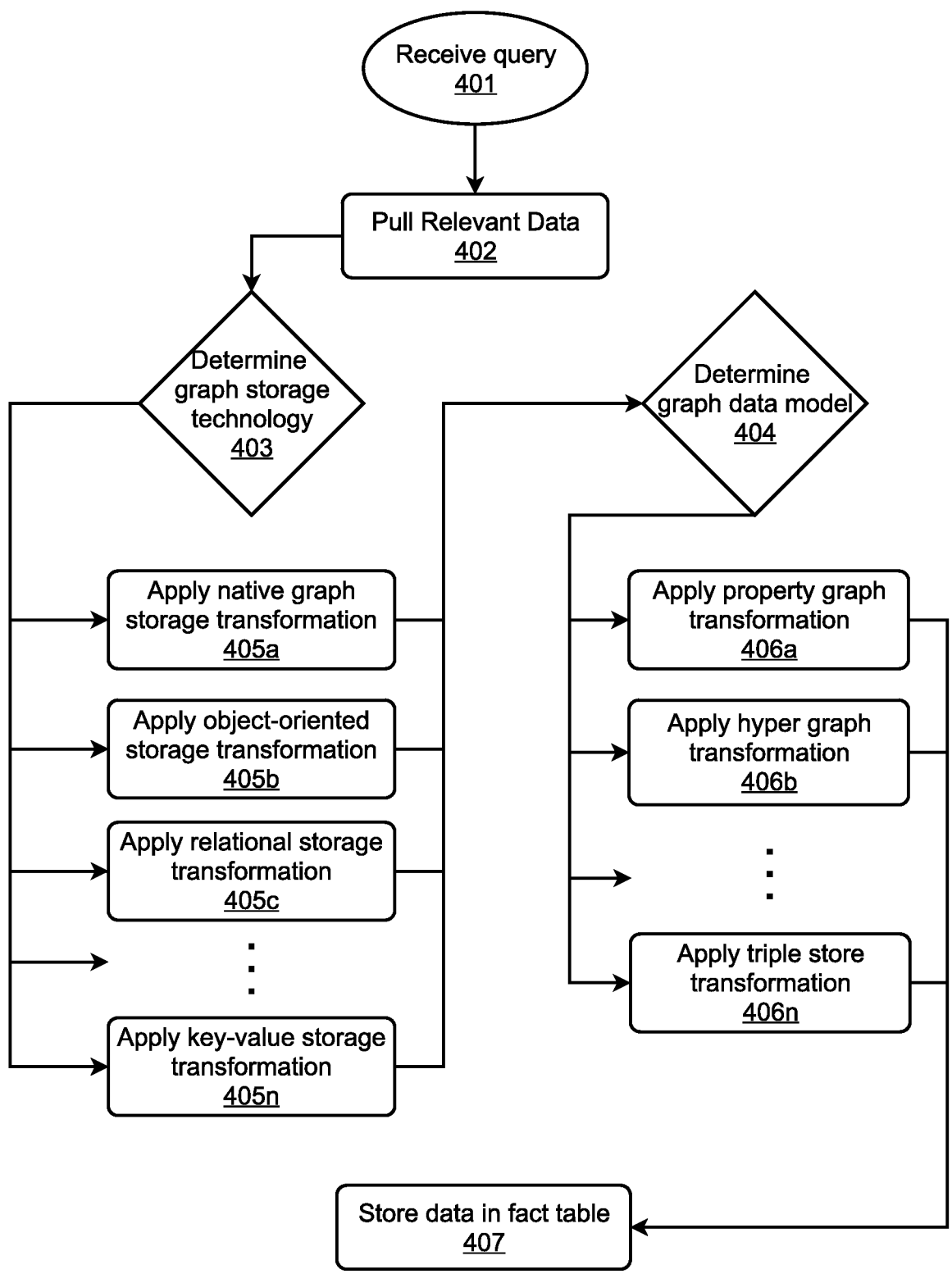
FIG. 4 is a flow diagram illustrating an exemplary method for graph data conversion, according to one aspect.

FIG. 4 is a flow diagram illustrating an exemplary method for graph data conversion, according to one aspect. Regarding the translation of graph data into relation data tables, the following diagram provides an exemplary decision tree for converting various common graph storage and graph data model types to relational data (facts suitable for use with programming logic languages for deductive reasoning).

Upon receiving a query 401 and retrieving a chunk of relevant graph data in return 402, two characteristics of the graph data must be obtained. The type of storage technology 403 (e.g., native graph, object-oriented, relational, key-value, etc.) and the data model 404 (e.g., property graph, hyper graph, triple store, etc.). Additionally, and obvious to the user, the storage and model format for which to convert the graph data too must be predetermined. Typically, this is already resolved by the IT staff or engineering department. Any fact table or fact table suitable for use with programming logic languages for deductive reasoning may be used as the destination format granted the translation modules are written for such a database.

Typically, for each data conversion, only one type of graph storage transformation (405$a$-$n$) and only one type of graph data model exists per database (406$a$-$n$). FIG. 2 was an example of a method for the transformation of native property graphs 405$a$/406$a$. The same methodology may be extrapolated for use in the other technologies and models (405$b$-$n$ and 406$b$-$n$).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 5:
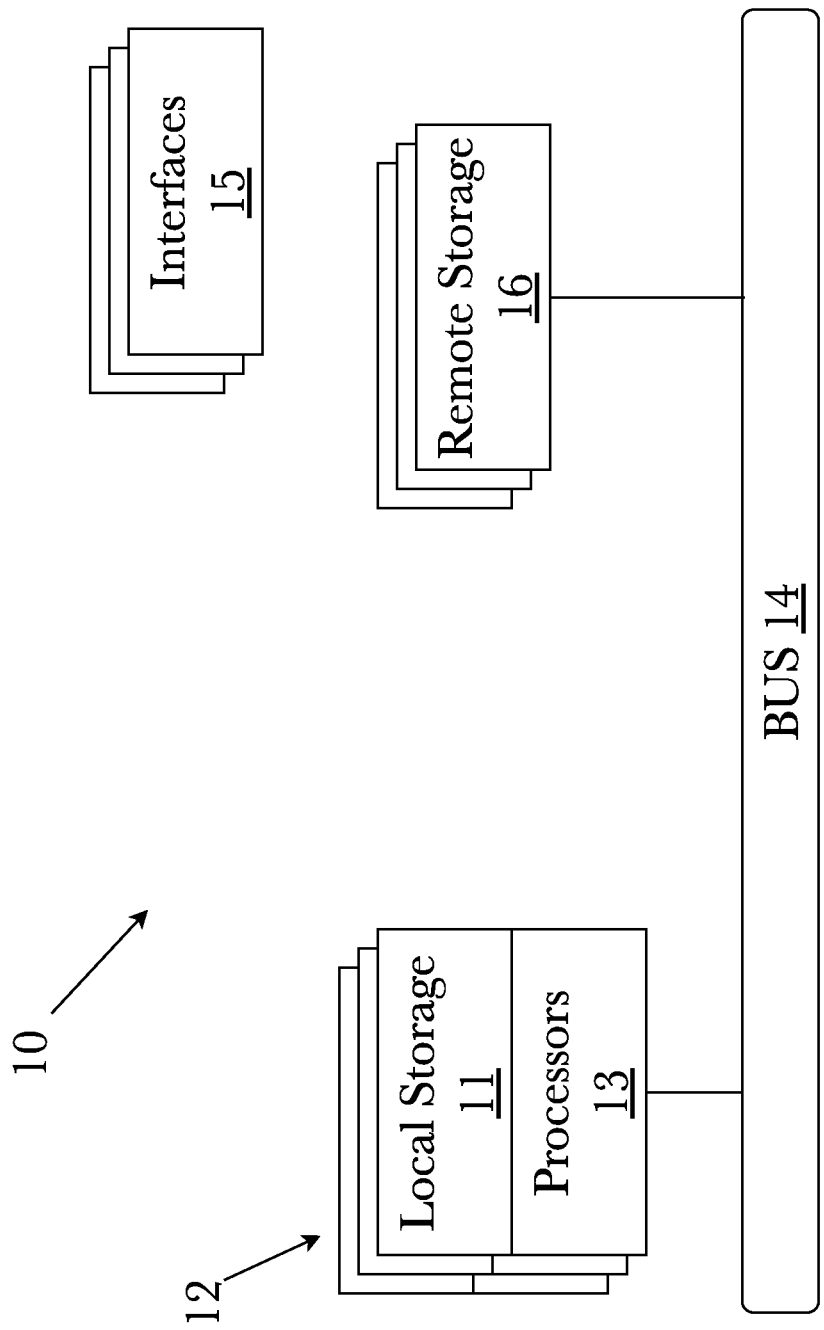
FIG. 5 is a block diagram illustrating an exemplary hardware architecture of a computing device.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
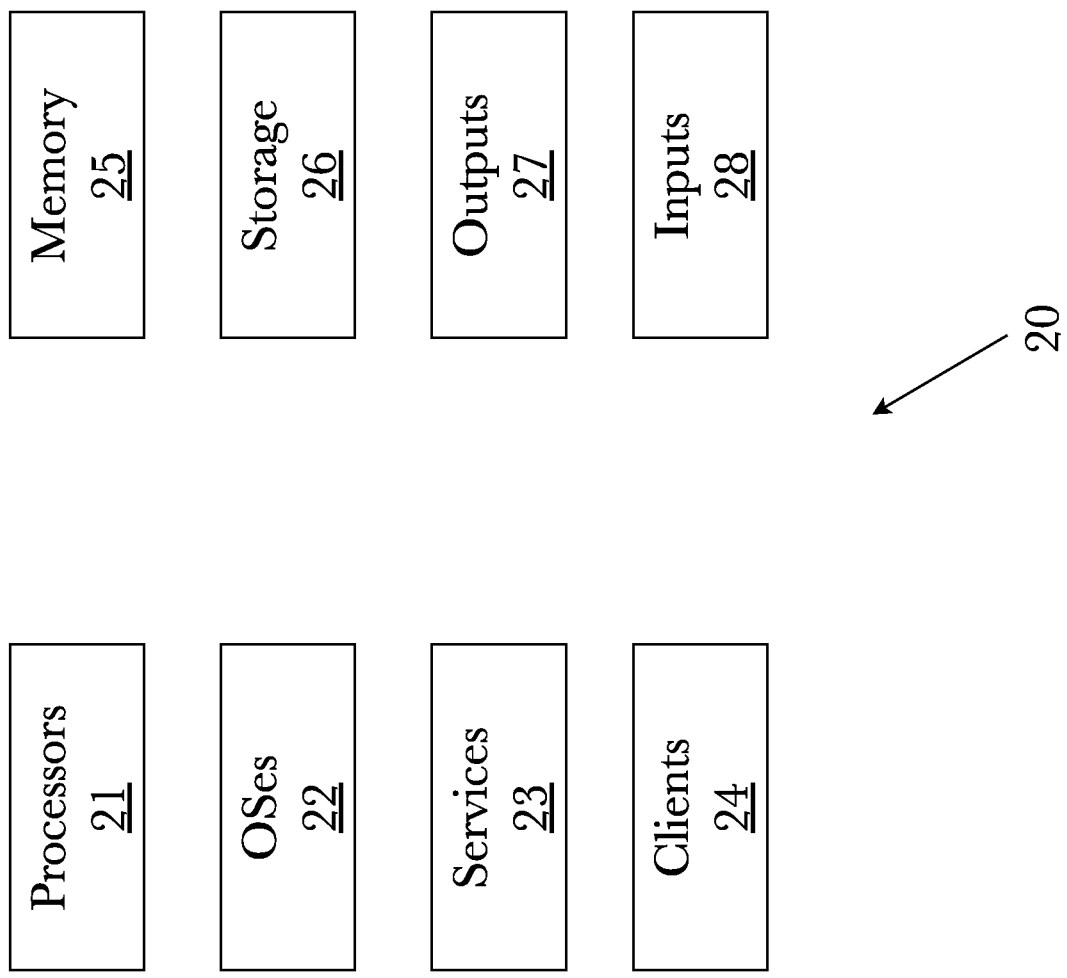
FIG. 6 is a block diagram illustrating an exemplary logical architecture for a client device.

In some aspects, systems may be implemented on a standalone computing system. Referring now to FIG. 6, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
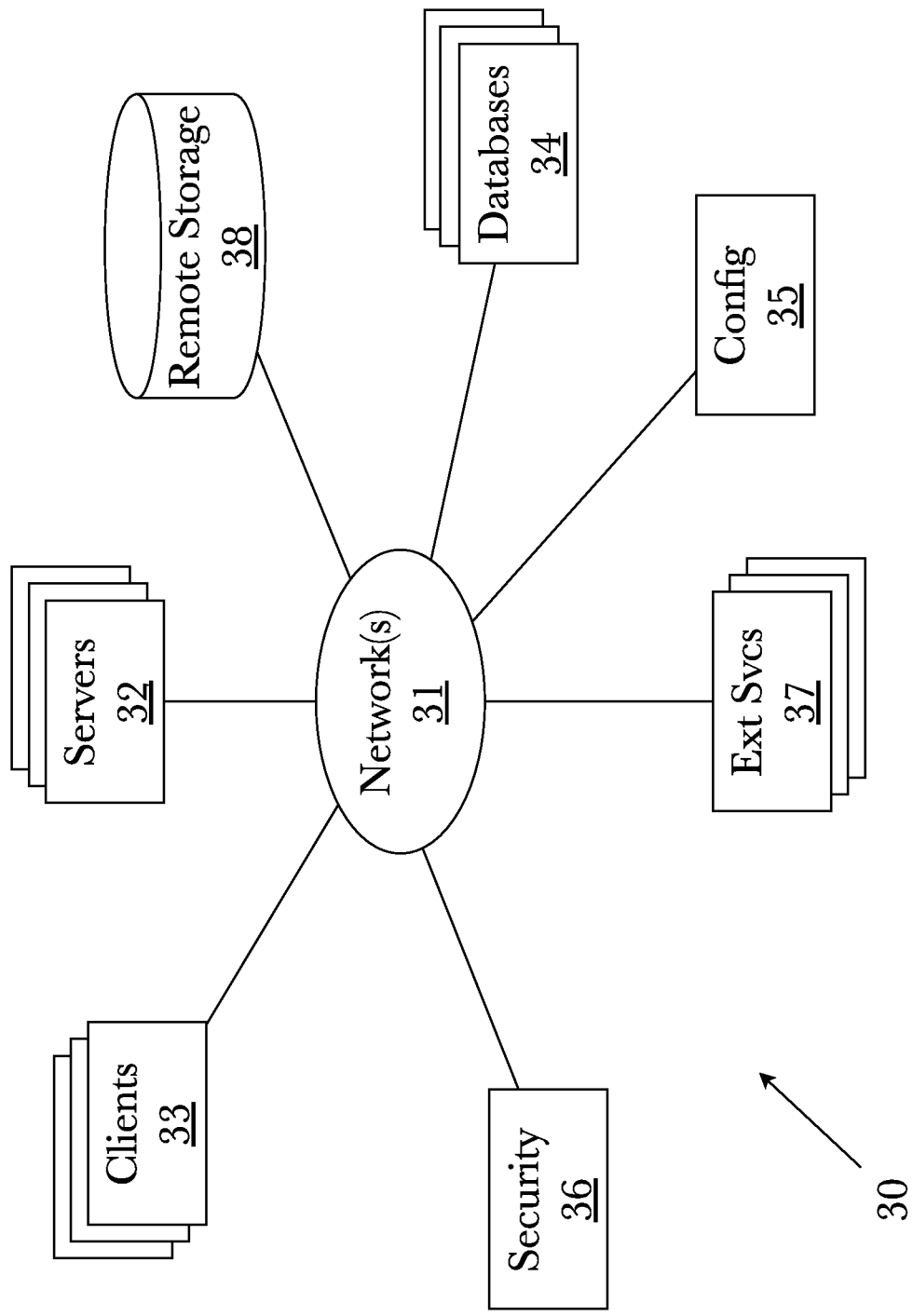
FIG. 7 is a block diagram showing an exemplary architectural arrangement of clients, servers, and external services.

In some aspects, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a fact table system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 8:
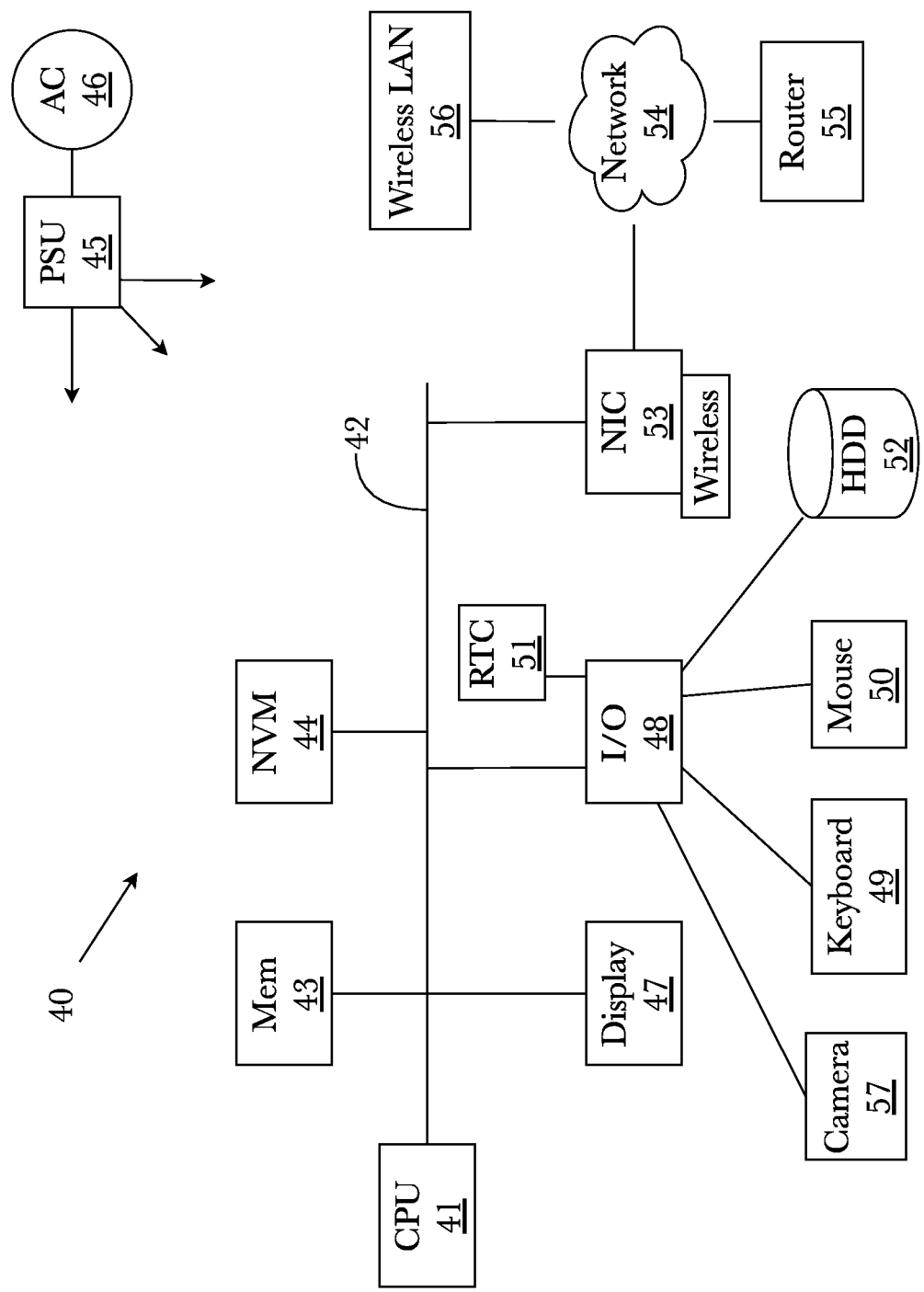
FIG. 8 is another block diagram illustrating an exemplary hardware architecture of a computing device.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for analyzing graph databases using intelligent reasoning systems including scalable collection of, and transformation of, graph data into facts for use with programming logic languages for deductive reasoning, comprising:
   a computing device comprising a memory, a processor, and a non-volatile data storage device;
   a stream processing engine comprising a first plurality of programming instructions stored in the memory of, and operating on the processor of, the computing device, wherein the first plurality of programming instructions, when operating on the processor, cause the computing device to:

receive an ontology-mediated query, wherein the ontology-mediated query is constructed by a programming logic language;

ingest one or more graph-based databases related to the ontology-mediated query;

determine a conversion configuration for each graph-based database, the conversion configuration comprising a storage technology and data model of that graph-based database and a storage format and model format for a fact table into which the graph-based database is to be converted; and send the conversion configuration of each graph-based database to a translation service;

a translation service comprising a second plurality of programming instructions stored in the memory of, and operating on the processor of, the computing device, wherein the second plurality of programming instructions, when operating on the processor, cause the computing device to:

convert each graph-based database to facts suitable for use with programming logic languages for deductive reasoning, wherein the conversion is based on the identified storage technology and data model; and send the facts suitable for use with programming logic languages for deductive reasoning to a sharding service;

a sharding service comprising a third plurality of programming instructions stored in the memory of, and operating on the processor of, the computing device, wherein the third plurality of programming instructions, when operating on the processor, cause the computing device to:

combine the facts suitable for use with programming logic languages for deductive reasoning from the graph-based databases into the fact table; and a semantic reasoner comprising a fourth plurality of programming instructions stored in the memory of, and operating on the processor of, the computing device, wherein the fourth plurality of programming instructions, when operating on the processor, cause the computing device to:

satisfy the ontology-mediated query by analyzing the fact table; and output the ontology-mediated query results.

2. The system of claim 1, further comprising an event log, wherein the event log provides a means for data provenance.

3. The system of claim 1, wherein the stream processing engine uses distributed computing to process the ontology-mediated query.

4. The system of claim 1, further comprising a semantic reasoner.

5. The system of claim 4, wherein the semantic reasoner deduces new information from the fact table.

6. The system of claim 5, wherein the new information is integrated into the fact table.

7. The system of claim 6, wherein the semantic reasoner uses the fact table to satisfy a hypothetical query.

8. A method analyzing graph databases using intelligent reasoning systems including scalable collection of, and transformation of, graph data into facts for use with programming logic languages for deductive reasoning, comprising the steps of:

receiving an ontology-mediated query, wherein the ontology-mediated query is constructed by a programming logic language;

ingesting one or more graph-based databases related to the ontology-mediated query;

determining a conversion configuration for each graph-based database, the conversion configuration comprising a storage technology and data model of that graph-based database and a storage format and model format for a fact table into which the graph-based database is to be converted; and converting each graph-based database to facts suitable for use with programming logic languages for deductive reasoning, wherein the conversion is based on the identified storage technology and data model;

combining the facts suitable for use with programming logic languages for deductive reasoning from the graph-based databases into the fact table; and providing the fact table to the programming logic language to satisfy the ontology-mediated query;

satisfying the ontology-mediated query by analyzing the fact table; and outputting the ontology-mediated query results.

9. The method of claim 8, further comprising an event log, wherein the event log provides a means for data provenance.

10. The method of claim 8, wherein the stream processing engine uses distributed computing to process the ontology-mediated query.

11. The method of claim 8, further comprising a semantic reasoner.

12. The method of claim 11, wherein the semantic reasoner deduces new information from the fact table.

13. The method of claim 12, wherein the new information is integrated into the fact table.

14. The method of claim 13, wherein the semantic reasoner uses the fact table to satisfy a hypothetical query.

* * * * *